United States Patent [19]
Bergmann et al.

[11] 3,875,080
[45] Apr. 1, 1975

[54] PROCESS FOR PREPARING SUPPORTED SILVER CATALYSTS FOR THE PRODUCTION OF ETHYLENE OXIDE

[75] Inventors: Herbert Bergmann; Hermann Springmann; Horst Weberschaer; Willi Braukmann, all of Marl, Germany

[73] Assignee: Chemische Werke Huls Aktiengesellschaft, Marl, Germany

[22] Filed: July 13, 1972

[21] Appl. No.: 271,574

Related U.S. Application Data

[63] Continuation of Ser. No. 4,743, Jan. 21, 1970, abandoned.

[30] Foreign Application Priority Data
Jan. 31, 1969  Germany.............................. 1904642

[52] U.S. Cl............... 252/455 R, 252/463, 252/476
[51] Int. Cl............................................... B01f 11/20
[58] Field of Search................ 252/455 R, 463, 476

[56] References Cited
UNITED STATES PATENTS

| | | | |
|---|---|---|---|
| 2,270,165 | 1/1942 | Groll et al........................ | 252/476 X |
| 2,709,173 | 5/1955 | Brengle et al.................... | 252/476 X |
| 2,857,442 | 10/1958 | Hay.................................. | 260/673.5 |
| 3,172,893 | 3/1965 | Ameen............................. | 252/476 X |
| 3,773,693 | 11/1973 | Calcagno et al................ | 252/463 X |

*Primary Examiner*—Winston A. Douglas
*Assistant Examiner*—W. J. Shine
*Attorney, Agent, or Firm*—Krafft & Wells

[57] ABSTRACT

Improved catalysts for the production of ethylene oxide prepared by agitating a mixture of porous support material and an aqueous suspension of silver oxide under a given pressure reduced below atmospheric, creating a gauge pressure differential periodically between the given pressure and atmospheric pressure and subsequently reducing the mixture.

5 Claims, No Drawings

3,875,080

PROCESS FOR PREPARING SUPPORTED SILVER CATALYSTS FOR THE PRODUCTION OF ETHYLENE OXIDE

This is a continuation of application Ser. No. 4,743, filed Jan. 21, 1970, now abandoned.

CROSS REFERENCE TO A RELATED APPLICATION

BACKGROUND OF THE INVENTION

The field of the invention is catalysts or solid adsorbents, and particularly catalysts for the production of olefinic oxides.

The state of the prior art of silver catalysts for the production of ethylene oxide may be ascertained by reference Kirk-Othmer Kirk-othmer "Encyclopedia of Chemical Technology", 2nd Ed., Vol. 8 [1966], pages 523–558, under the section entitled "Ethylene Oxide". Kirk-Othmer discloses the direct oxidation process for the production of ethylene oxide on pages 534–538, and on pages 539–540 the preparation of the catalysts, promoters and supports is disclosed.

The prior art is further illustrated by the following patent literature.

U.S. Pat. Nos. 2,477,435; 2,825,701; and 3,043,854; German Patents 971,452; 1,068,235; and 1,221,620 of Alfred Saffer (corresponding to U.S. application Ser. No. 17,430, filed Mar. 24, 1960, now U.S. Pat. No. 3,207,700); German Published Application (DAS) 1,059,429 of Ralph Landau, published June 18, 1959; 1,064,046 (corresponding to U.S. Pat. No. 2,825,701); 1,211,607 of Bruns & Schnuchel, published Mar. 3, 1966; and 1,260,451 of Brown & Saffer (corresponding to U.S. application Ser. No. 142,035 filed Oct. 2, 1961, now abandoned); and French Patent 1,413,213 of Casalanga.

The direct oxidation of ethylene to ethylene oxide is conducted conventionally in the presence of silver-containing catalysts. The support materials employed in this connection are more or less porous masses, such as, for example, aluminum oxide, kieselguhr, pumice, silica, calcium carbonate, charcoal, clay or graphite (German Patents 1,068,235; 1,221,620; and 971,452).

The catalysts for the oxidation of ethylene to ethylene oxide are basically produced in accordance with two processes, namely;

a. by applying the active silver layer, with the aid of an aqueous suspension, onto a support (suspension method); or b. by impregnating a porous support material with the aid of a silver salt solution (impregnating method).

In both cases, the catalysts to be treated are subjected to a thermal post-treatment.

In the so-called "suspension method", an aqueous slurry of silver oxide is customarily applied to a ceramic support material, for example, aluminum oxide. During this procedure, a more or less thick coherent activating silver layer is formed on the support. This layer is easily damaged mechanically. Furthermore, this layer does not adhere well to the support material and consequently flakes off easily. Thereby, the pressure difference in the reaction tube is increased, so that, finally, when this pressure difference increases more and more, the process is no longer economical. (Jean Jaques Bodson, Ind. Chem. belge 32[1968], p. 883).

In order to avoid these disadvantages, attempts have been made to cause the precipitated silver oxide particles to penetrate as deeply as possible into the pores of the support material, in order to protect them against mechanical abrasion thereby, and thus to lengthen the lifetime of the catalyst.

Thus, for example, according to the methods of DAS 1,064,046 and U.S. Pat. No. 2,825,701, a particularly finely divided, catalytically effective powder is obtained by precipitating silver carbonate and calcium carbonate together in a suitable ratio. This powder is applied, in a glycol-water mixture, to a support, whereby good adhesion to the support and deep penetration of the catalyst particles into the support are achieved. However, catalysts produced in accordance with this process are not sufficiently efficient, in spite of the above-described measures.

In the so-called "impregnating method", an aqueous silver salt solution or a silver salt melt is employed instead of a suspension of silver oxide.

Thus, for example, according to the process of DAS 1,211,607, a porous support material is impregnated with an aqueous solution of silver lactate, and the lactate is decomposed to metallic silver after drying at temperatures of between 250° and 380°C. In a preferred embodiment, the water is withdrawn from the silver salt solution under reduced pressure.

The so-called impregnating method exhibits the disadvantages:

a. that an additional process step is necessary for the preparation of the water-soluble silver salt;

b. that the impregnated support must be dried for a long period of time (DAS 1,260,451, Example 1); and c. that the soluble silver salt must be decomposed at high temperatures (DAS 1,211,607; U.S. Pat. No. 2,477,435, Example 2; and DAS 1,059,429, Example 1).

Since, according to usual experience, the reduction or decomposition temperature used in the production of the catalyst determines the subsequent reaction temperature, catalysts are thus obtained according to this method which are economically efficient only at relatively high operating temperatures. Consequently, special furnace constructions are necessary for the economical industrial application of this process, which constructions make it possible, for example, with the aid of a heat-conductive fluid, to obtain working temperatures of 300°C and thereabove. Such high temperatures are not readily achieved by means of less expensive boiling water reactors. However, boiling water reactors exhibit - due to the high specific heat of evaporation - the advantage of a better heat removal, which feature makes them appear to be particularly suitable for catalysts permitting a high conversion.

However, a special disadvantage of the catalysts produced in accordance with the so-called impregnating method resides in that they permit good selectivity, but only low conversion ("La Fabrication de l'oxyde d'ethylene", Jean Jaques Bodson, Ind. Chem. belge 32[1967], pp. 880–887.

SUMMARY OF THE INVENTION

Having in mind the limitations of the prior art, it is an object of the present invention to provide a supported silver catalyst for the oxidation of ethylene to ethylene oxide, wherein the catalyst combines the advantages of the silver catalysts prepared according to the so-called suspension method as well as those prepared according to the so-called impregnating method, without exhibiting the disadvantages of these methods. This catalyst has a long lifetime with a high conversion and a high yield with low abrasion and low pressure loss.

This object is accomplished, in accordance with the invention, by exposing the mixture of porous support material and the aqueous suspension of silver oxide to a given pressure reduced below atmospheric, creating a gauge pressure differential periodically between the given pressure and atmospheric pressure, in a suitably agitated vessel.

DESCRIPTION OF THE PREFERRED EMBODIMENTS

In a preferred embodiment, the reduced pressure is not maintained at the same level during the treatment period. By intermittent pressure fluctuations, produced by decreasing the applied vacuum for a short time and then reestablishing same, the pressusre in the reaction vessel is constantly changed periodically. This has the effect that the suspended silver oxide penetrates even more satisfactorily into the pores of the support material, without the occurrence of clogging and coating the surface of the support with a compact mass of silver oxide. The thus-applied silver, after the reduction of the silver oxide has been performed, is resistant to mechanical abrasion, particularly on the surface of the support material and not only in the deep layers of the pores.

Even after a long period of operation, the reaction tubes are not clogged by material abraded from the catalyst; consequently, no pressure drop occurs. The distribution of the silver in the support material is especially advantageous, so that the catalyst also conducts heat away in a satisfactory manner, and thus exhibits a low sensitivity toward thermal stresses.

The support material utilized for the production of the catalysts employed in accordance with the invention are used in the form of spheres, rings, pellets, or such shapes which cause as low a pressure drop in the reaction tube as possible. In particular, shaped bodies are employed which consist predominantly of $\alpha$-aluminum oxide. The pore volume of the support is suitably above 50 percent, particularly about 60 percent and thereabove; the pore diameter is approximately 200 to about 2,000 $\mu$, especially up to about 1,500 $\mu$. By pretreating the support material with dilute aqueous nitric acid, the pore volume of the support material is further increased. By this treatment, minor proportions of alkali oxide, which is likewise contained in the support material, are dissolved and thus removed. The finished catalyst still contains open, clearly noticeable pores, i.e., the noticeable structure of the support material. In contrast thereto, according to the suspension method, catalysts are usually obtained wherein the structure of the support cannot be recognized.

The large pore support material employed according to this invention results - contrary to the statements in the literature in good yields with high conversions (cf. DAS 1,260,451 in conjunction with DAS 1,211,607 and French Patent 1,413,213).

The catalysts employed in accordance with the invention are prepared as follows:

a. first of all, silver oxide is conventionally precipitated from an aqueous solution of a silver salt, suitably silver nitrate, by an aqueous solution of sodium hydroxide or potassium hydroxide. The filtered-off silver oxide is washed with distilled water until the washing water removed is free of salt;

b. the silver oxide is introduced into a vessel, together with the support material and thereafter, a suspension is produced by the addition of water. The aqueous silver oxide suspension contains generally 20 – 60 percent, particularly 45 – 55 percent of silver oxide;

c. the mixing vessel is heated and rotated. Suitably, a rotating mixing drum is employed. The mixture is heated in the mixing vessel to temperatures of 20° – 70°C and, at the beginning of the mixing step, the pressure is reduced in the mixing vessel below atmospheric. In general, the process is conducted at a gauge pressure of 12 – 70 mm Hg, especially 30 – 40 mm Hg. The speed of rotation of the mixing vessel is about 10 r.p.m. After 5 – 10 minutes, the mixing vessel is arrested and caused to execute only several rotations in intervals of 1 – 3 minutes. The mixing under reduced pressure of 12 – 70 mm Hg and at a temperature of 20° – 70°C is continued for a total of 30 to 60 minutes and preferably of 45 minutes;

d. the water contained in the mixture is distilled off and the crude catalyst is reduced, without an intermediate drying step, in a gaseous stream containing hydrogen, at a temperature of 150° to 240°C, during the course of two hours, that is to say that by bringing in the crude catalyst in the reducing zone the temperature is 150°C an in the main zone the temperature is 240°C.

In a special embodiment, the vacuum which is applied is not maintained at constant value, but rather the pressure is increased by a short-term ventilation, though not to full atmospheric pressure of 760 mm Hg. The gauge pressure differential obtained by this measure ranges generally between 700 (760-60) and 750 (760-10) mm Hg, particularly between 740 (760-20) and 720 (760-40) mm Hg.

How often the pressure change is executed depends on the respectively ambient conditions. In general, one pressure change will be conducted during the course of one minute. The catalyst obtained is reduced without intermediate drying. In many cases, it is suitable - in order to obtain a higher proportion of activating metal - to repeat the treatment both with the aqueous silver oxide suspension, and the reduction, once or several times.

The finished catalyst exhibits a piled weight of about 1004 grams/liter.

The silver content of the catalysts ranges generally between 150 and 460 grams/liter, particularly between 200 and 305 grams/liter, corresponding to 15 percent to 35 percent, particularly between 19 percent to 27 percent by weight of silver.

The catalysts produced in accordance with this invention are employed in the usual processes for the conversion of ethylene to ethylene oxide by the direct oxidation with oxygen in the presence of a catalyst. The direct oxidation of ethylene is conducted, in this connection, for example, at a temperature range of between 240° and 330°C, and the oxygen required for the oxidation is supplied either in the pure form or in diluted form, for example, as air.

The catalysts are arranged - as customary in the direct production of ethylene oxide - for example in tubes over which the gaseous mixture is conducted.

Without further elaboration, it is believed that one skilled in the art can, using the preceding description, utilize the present invention to its fullest extent.

EXAMPLE 1

240 grams of silver nitrate (1.143 moles) are dissolved in 3,000 ml. of fully desalted water. In order to precipitate the silver oxide, a solution of 62.2 grams of sodium hydroxide in 250 cc. of fully desalted water is gradually added at room temperature with stirring, so that the temperature does not rise above 25°C. The thus-precipitated silver oxide is vacuum-filtered and washed with fully desalted water until the washing water which is discharged is free of salt. The thus-obtained moist silver oxide is introduced into a heatable and evacuable pelletizing drum.

The silver oxide precipitate is suspended in 300 ml. of fully desalted water (silver oxide content of the suspension: 52.2%), and 1,000 ml. (about 845 grams) of support material is added. The support material, present in the form of spheres, has the following composition and properties:

85 percent by weight of $\alpha$-aluminum oxide
13 percent by weight of silicon dioxide
diameter: 6 – 9 mm.
pore volume: about 60 percent
pore diameter: 200 – 1,500 micron At a temperature of 60°C and a pressure of 30 – 40 mm Hg, the support and the suspension are mixed together. The speed of rotation of the drum is about 10 r.p.m.

The pressure applied thereto of about 30 – 40 mm Hg is elevated, approximately once per minute, by ventilating for a short time, to 750 – 700 mm. Hg. The amount of water added thereto is distilled off in about 30 minutes.

The crude catalyst obtained thereby is thereafter reduced, without an intermediate drying step, in a gaseous stream (8 percent of hydrogen, the remainder being nitrogen) of 100 liters/hour at 170° – 220°C during the course of 2 1/2 hours.

In a further treatment, an additional layer of active silver is applied to the catalyst in the same manner.

The finished catalyst exhibits a piled weight of about 1,150 grams/liter and contains 305 grams of silver per liter (26.5 percent by weight of silver).

800 cc. of the silver catalyst produced according to Example 1 is filled into a reaction tube of stainless steel having an inside diameter of 18 mm. and a length of 4,000 mm.

The temperature of the water in a double jacket is 278°C, corresponding to a steam pressure of 70 atmospheres gauge. A gaseous mixture having the composition set out below is passed through the reaction tube at a throughflow rate of 6 Nm³/h. (cubic meters per hour at normal conditions) and at a pressure of 6 atmospheres gauge:

4.0 percent by volume of ethylene
7.0 percent by volume of oxygen
7.2 percent by volume of carbon dioxide
remainder: nitrogen After a duration of the experiment of 27 days, the conversion amounts to 44 percent of the ethylene employed, and the yield of ethylene oxide is 74.7 percent.

EXAMPLE 2 a. The silver catalyst is prepared as described in Example 1, but the finished catalyst contains 203 grams of silver per liter of support material (19.37 percent by weight of silver).

The catalyst is tested in an apparatus consisting of three reaction tubes having a length of 6,000 mm. and a diameter of 26 mm., made of stainless steel. The reaction tubes are surrounded by a jacket containing water or steam, whereby the removal of the heat of reaction is ensured. The temperature in the steam chamber is 279°C. Each of the three reaction tubes is filled with 2.7 liters of catalyst.

A gaseous mixture consisting of:
4 percent by volume of ethylene
5 percent by volume of oxygen
7.8 percent by volume of carbon dioxide
remainder: nitrogen, is passed over the catalyst with a throughput rate of 20 Nm³/h. The pressure is 19.2 atmospheres gauge. On the 70th day of the experiment, the catalyst operates at a conversion of 46.6 percent and a yield of 71.6 percent. The efficiency of the catalyst remained constant over the entire period of the experiment. The pressure drop ($\Delta p$) in the reaction tube was 0.6 atmosphere gauge.

b. The same catalyst, at a throughput of 22.3 Nm³/h exhibits, after 110 days of operation, only a pressure drop of 0.73 atmosphere gauge. The yield is 71.7 percent, with a conversion of 47.3 percent.

c. In the same manner, the catalyst is tested in another apparatus consisting of a stainless steel tube having a length of 6,000 mm. and a diameter of 26 mm., into which tube additional temperature probes have been introduced and which has likewise been filled with 2.7 liters of catalyst having a silver content of 203 grams per liter of catalyst.

The reaction gas has the same composition. The steam temperature is 268°C, the throughput is 22.3 Nm³/h. The reaction pressure amounts to 19.8 atmosphere gauge. A yield of 71.5 percent is obtained at a conversion of 45 percent. The pressure drop ($\Delta p$) in the reaction tube is 0.95 atmospheres gauge.

e. If the catalyst employed in Examples 2(a), (b), (c) is utilized, at a pressure of 18.5 atmospheres gauge and an ethylene content of the gas of 5 percent by volume, then the conversion, after 100 days of operation, is 42 percent, with a yield of 71.5 percent.

COMPARATIVE EXAMPLE d. When a catalyst is employed likewise containing, per liter of catalyst, 203 grams of silver and the same support, which, however, has been produced without the use of reduced pressure-i.e., at normal pressure - then, when using the same gaseous mixture, at a throughput of 22.3 Nm³/h., a steam temperature of 262°C, and a pressure of 19.8 atmospheres gauge, only a conversion of 34.7 percent and only a yield of 67.0 percent are obtained. When increasing the steam temperature to 267°C, the conversion is 34.7 percent, but the yield is decreased to 65.6 percent. The apparatus of Example 2(c) is employed in this connection.

EXAMPLE 3

A silver catalyst produced as described in Example 1 and containing 203 grams of silver per liter of support material, is tested in a stainless steel tube of a length of 6,000 mm. and an inside diameter of 26 mm. 12.5 Nm³/h. of a gaseous mixture consisting of:
2.6 percent by volume of ethylene
4.45 percent by volume of oxygen
8.5 percent by volume of carbon dioxide remainder: nitrogen,
is passed, at a pressure of 18.0 atmospheres gauge, over 2.7 liter of catalyst. The heat of reaction is removed with the aid of water. At a steam temperature of 273°C, a conversion of 73.9 percent and a yield of 60.3 percent are obtained. The pressure drop ($\Delta p$) in the tube is 0.34 atmospheres gauge.

In Table 1, the results of the experiments and comparative experiments are compiled.

jecting it to a base vacuum of about 12 – 70 mm Hg in a depressurized vessel;

b. periodically allowing ventilation of the depressurized vessel to a pressure within the range of about 700 – 750 mm Hg of absolute pressure and thereby vaporizing water from the suspension without heating to form a crude catalyst mixture of $Ag_2O$ and porous support material; and c. reducing the crude catalyst in a gaseous stream containing hydrogen.

TABLE I.

|  | 1 | 2(a) | Example 2(b) | 2(e) | Comparative Example 2(d) |  | Example 2(c) |
|---|---|---|---|---|---|---|---|
|  |  | According to the invention |  |  |  |  | According to the invention |
| Temperature °C | 278 | 279 | 280 | 280 | 262 | 267 | 268 |
| Pressure, Atm. Gauge | 6 | 19.2 | 19.2 | 18.5 | 19.8 |  | 19.8 |
| Throughput Nm³/h | 6 | 20 | 22.3 | 22.3 | 22.3 |  | 22.3 |
| Silver/l. Catalyst | 305 | 203 | 203 | 203 | 203 |  | 203 |
| Ethylene, Vol. — % | 4 | 4 | 4 | 5 | 4 |  | 4 |
| Oxygen, Vol. — % | 7 | 5 | 5 | 5 | 5 |  | 5 |
| Pore Diameter u | 50 | — 1,500 u in all examples |  |  |  |  |  |
| Operating Period, Days | 27 | 70 | 110 | 100 | 20 | 20 | 20 |
| $\Delta p$, Atm. Gauge | 0.42 | 0.60 | 0.73 | 0.80 | 0.95 | 0.95 | 0.95 |
| g. Ethylene Oxide/Nm³ | 26.1 | 26.4 | 26.9 | 29.7 | 18.4 | 18.0 | 25.6 |
| Conversion % | 44 | 46.6 | 47.3 | 42 | 34.7 | 34.7 | 45 |
| Yield % | 74.7 | 71.7 | 71.7 | 71.5 | 67.0 | 65.6 | 71.7 |

The varying values for the pressure differences in Examples 2(a), (b), (e) and 2(c) and 2(d), with the same charge stem from the reactors employed, wherein additional temperature probes are provided in the reactor utilized in Examples 2(c) and 2(d), which cause the increased pressure differences.

We claim:

1. In a process for preparing supported silver catalysts for the catalytic oxidation of ethylene to ethylene oxide, comprising forming an aqueous suspension of $Ag_2O$ and porous support material selected from the group consisting of $\alpha$-aluminum oxide and mixtures of $\alpha$-aluminum oxide and silicon dioxide, said support material having pores withh diameters of about 200 – 2000 $\mu$ and a pore volume greater than 50 percent, the improvement comprising:

a. simultaneously agitating the suspension and subjecting it to a base vacuum of about 12 – 70 mm Hg in a depressurized vessel;

2. The process of claim 1, wherein the depressurized vessel is ventilated to a pressure within the range of about 720–740 mm Hg.

3. The process of claim 1, wherein said base vacuum is between about 30 and 40 mm Hg.

4. The process of claim 1, wherein the suspension is agitated at a temperature of about 20° – 70°C.

5. The process of claim 4, wherein the step of reducing is carried out at a temperature of about 150° – 240°C.

* * * * *